United States Patent [19]

Schnaibel

[11] 4,247,896
[45] Jan. 27, 1981

[54] GUIDANCE CONTROL SYSTEM FOR A STEERABLE, TRACKLESS VEHICLE

[75] Inventor: Eberhard Schnaibel, Hemmingen, Fed. Rep. of Germany

[73] Assignee: Robert Bosch GmbH, Stuttgart, Fed. Rep. of Germany

[21] Appl. No.: 12,566

[22] Filed: Feb. 15, 1979

[30] Foreign Application Priority Data

Mar. 11, 1978 [DE] Fed. Rep. of Germany ....... 2810664

[51] Int. Cl.³ .................... G06F 15/50; G06G 7/78
[52] U.S. Cl. .................................. 364/436; 180/168; 318/587; 324/207; 364/449
[58] Field of Search ............... 364/436, 447, 449, 561; 180/167–169; 324/207, 208; 318/587, 647, 653

[56] References Cited

U.S. PATENT DOCUMENTS

| 3,644,825 | 2/1972 | Davis, Jr. et al. | 324/207 |
| 4,040,500 | 8/1977 | Blakeslee | 180/168 |
| 4,079,801 | 3/1978 | Dobson | 180/168 |
| 4,079,803 | 3/1978 | Takada et al. | 318/587 |

*Primary Examiner*—Jerry Smith

*Attorney, Agent, or Firm*—Frishauf, Holtz, Goodman & Woodward

[57] ABSTRACT

To decode signals picked up in a horizontal and vertical coil on the vehicle induced by a buried a-c energized cable, in which the vertical position of the coil above the cable is determined, a null sensing circuit is coupled to the horizontal coil to sense when the signal induced therein passes through zero. The signal induced in the vertical coil is likewise sensed, but rather than sensing the null, the peak value is determined. This peak value induced in the vertical coil will occur some time after the signal in the horizontal coil has passed through null or zero, and the peak value in the vertical coil is compared with the rise in signal in the horizontal coil. When the two signals (peak and rising horizontal coil signals) are equal, the time between the equality and the null point of the horizontal signal is determined, and used as a control parameter to steer the vehicle so that this time will be effectively null or zero, at which time the vehicle will be centered over the guide cable. The time can be determined by the count of a counter, the count state of which is transferred to a memory for read-out at a clock rate determined by a steering computer.

10 Claims, 5 Drawing Figures

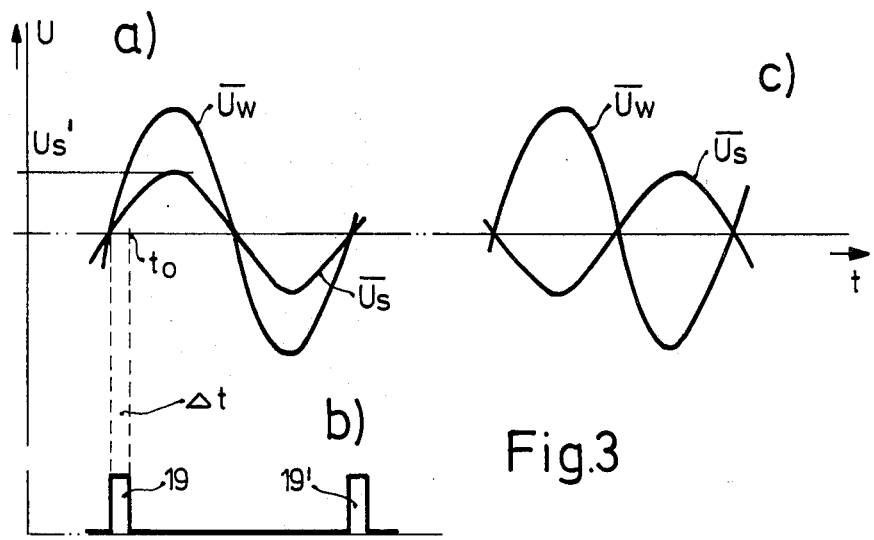
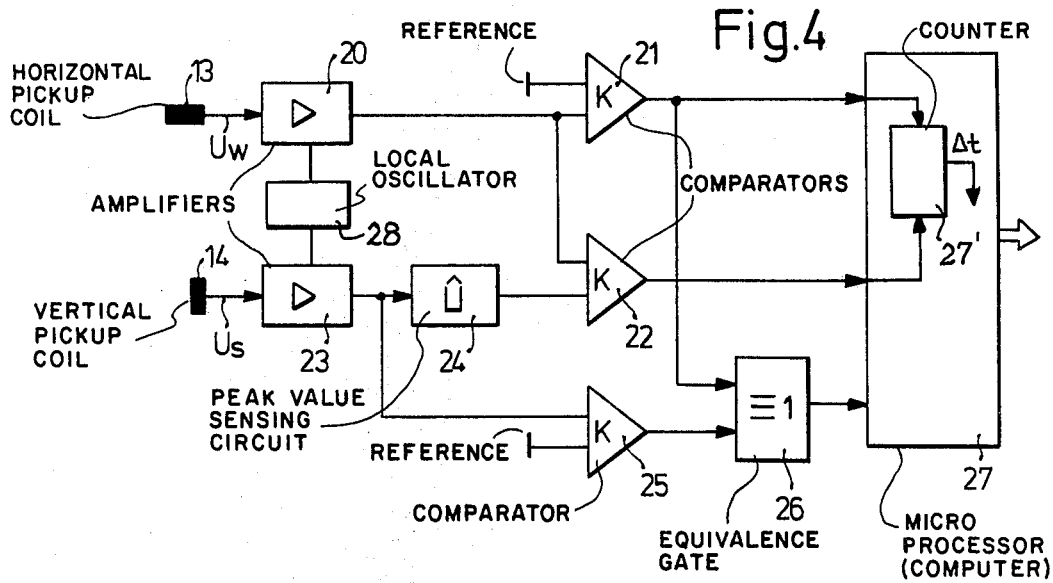

GUIDANCE CONTROL SYSTEM FOR A STEERABLE, TRACKLESS VEHICLE

The present invention relates to a guidance control system for a trackless vehicle having a steering system which is controlled by a servo system to follow a guidance path, defined by the position of a guidance cable through which an alternating current is passed.

Background and Prior Art. It is known to guide the path of a steerable, trackless vehicle by embedding an electrical conductor in a surface, for example in a factory floor, and causing an alternating current to pass therethrough. A magnetic field will form around the conductor which is sensed by coils located on the vehicle, inducing voltages therein. These voltages will be representative of the respective distance of the coils from the cable, and thus define the position of the vehicle from the cable. The signals sensed by the coils are then processed in an electronic control apparatus which is arranged to solve the trigonometric functions represented by a signal induced in the coils which then define the position of the coils with respect to the cable, and hence can determine the position of the vehicle with respect to the cable. These signals, after processing, are then applied as positioning signals to a steering mechanism, typically a hydraulic servo power steering unit which deflects the front wheel or front wheels of the vehicle, tending to null any deviation from a given value; thus, the vehicle will follow the buried cable, and hence will be guided in the path in which the cable is placed.

It has previously been proposed to locate two coils at a predetermined position in the vehicle in mutually orthogonal position, that is, one coil having a vertical axis and one coil having a horizontal axis, both spaced by the same distance h from the support surface or, more accurately, from the cable (see German Disclosure Document DE-OS No. 23 28 863). Voltages will be induced in the coils in accordance with the relationships (1) and (2) wherein $\overline{U}_s$ is the vertical coil voltage, $\overline{U}w$ the horizontal coil voltage, $\alpha$ the angle of a straight line from the coil center to the cable and $\omega t$ the wave length of the signal in the cable. The quotient $\overline{U}_s/\overline{U}w$ of the two functions is then used to derive the linear function $\overline{U}=a/h$, in which the dimension a is the horizontal distance of the coil center from the guide wire and h the vertical distance of the coil center from the guide wire. The vertical distance h, of course, is a constant and determined by the position of the coils on the vehicle. From the linear function $\overline{U}=a/h$, the horizontal deviation or deflection a can be determined, based on the relationships (1) and (2), in which $$a = \text{arc } tg\, a/h.$$

Thus, sensing the voltages provides an output signal which is a measure of the deviation a of the respective vehicle from the path defined by the guide wire.

The arrangement described provides an output signal which is an analog of the error of the position of the vehicle with respect to the wire; in order to process the so derived information in a digital computer, for example in a microprocessor, it is necessary to convert the analog signal into digital form. This conversion introduces errors.

It has also been proposed to generate a signal which, in form of a time interval, is representative of the deviation of the vehicle from the guide path. This time signal is then evaluated in a microprocessor to control a servo steering system. In the known system, one of the two signal voltages sensed by the coils has to be shifted in a phase shifter by 90°. This causes non-linearities and difficulties which are particularly annoying in view of the wide frequency range of the signals being processed, unless complex and costly phase shifting networks and systems are used which, usually, are not suited for control of vehicles in an industrial environment and represent additional sources of errors and disturbances.

The Invention. It is an object to improve the sensing and control arrangement for a guidance system of a trackless guided vehicle and to generate output signals which can be directly processed in a digital microprocessor for control of the steering system of the vehicle.

Briefly, a null sensing circuit is coupled to the horizontal coil to sense when the signal induced in the horizontal coil passes through zero. The signal induced in the vertical coil is likewise sensed, but rather than sensing the null value thereof, the peak value of the signal induced in the vertical coil is determined. This peak value induced in the vertical coil will occur some time after the signal in the horizontal coil has passed through zero. The peak value induced in the vertical coil is compared with the rise in signals in the horizontal coil and when the two signals are equal, the time interval between the sensed passage through zero of the signal induced in the horizontal coil and the time when the peak value of the signal induced in the vertical coil and the signal in the horizontal coil are equal is determined, for example by counting out of a counter. An output signal representative of this time difference is obtained and applied to the steering control system of the vehicle.

The system which carries out the aforementioned computation or sensing preferably includes a comparator connected to the horizontal coil and sensing the null thereof; this comparator is connected to a timing circuit, for example a counter which starts a count sequence at a given clock rate, to initiate a timing interval. The vertical coil is connected to a peak sensing circuit, the output of which is connected to a second comparator which compares this peak value with the continuously changing value of the output from the horizontal coil. When equality is sensed, the output thereof is connected to the timing circuit, typically the counter, to stop counting; the count number then will be representative of the time interval as aforesaid.

The foregoing comparison determines the magnitude of deviation; the direction of deviation of the vehicle from the guide wire is determined by the relative phase positions of the signals induced in the coils, that is, of the relative instantaneous polarities. By decoding the relative instantaneous polarities, a signal representative of direction of positional error is obtained, for example by providing a third comparator which compares the output of the vertical coil with a reference to provide a digital signal representative of phase position, the output of which is connected to a gate having as a second input the output from the comparator connected to the horizontal coil and determining if the phase position of the two outputs is the same or different. The output of this equivalence gate is also connected to the microprocessor which controls the steering system of the vehicle to determine the direction of deflection of the steering system to null the positioning error of the vehicle with respect to the wire.

The arrangement has the specific advantage that deviation of the vehicle from the guide path defined by the wire is available in the form of a time interval which can be readily processed in a digital computer, for example in a microprocessor, by evaluating the time interval as a count number at a predetermined clock rate. This count number is directly representative of the error position, within a wide range of frequency, and without any linearity errors, and can be obtained directly from the voltages induced in the coils.

Determining the direction of deviation is simple, by a very simple logic circuit which merely decodes the relative phase position of the voltages induced in the coils, namely whether both voltages are positive or negative with respect to a reference, or whether one voltage is positive and the other negative, thereby obtaining output data or information determinative of the direction of deviation of the vehicle from the guide wire or cable.

Usually used signal frequencies passing through the cable are about 10 kHz, which requires a counting rate of the timing counter which is comparatively high in order to obtain a reasonably fine resolution of the deviation signal. In order to save costs, it is desirable to use counter stages having a lower counting rate. The signals induced in the coils can, however, be converted to lower frequency signals, for example by sampling-division, to obtain a lower intermediate frequency, thus permitting use of inexpensive counters operating at lower clock rates.

The counter which is used to determine the time interval may be separate or part of a computer system. The counter essentially starts counting at the time that the timing interval begins, and the count state which the counter reaches when it stops counting is then transferred into a buffer memory. The count number stored in the buffer memory can be read out at desired time intervals therefrom, time intervals which are determined by the computation rate or cycling rate of the microprocessor which in turn computes the deviation or deflection signal which controls the steering mechanism. The system is particularly effective if the time interval is determined by the number of pulses of a controllable reference oscillator which has a frequency synchronized with the frequency of the signal of the guidance cable and/or which has a frequency which is phase-controlled with respect to the frequency of the guidance cable.

Drawings, illustrating a preferred example:

FIG. 3 shows voltage and pulse relationships of signals in the system;

FIG. 4 is a highly schematic block circuit diagram of an embodiment of the invention.

Figure 1:
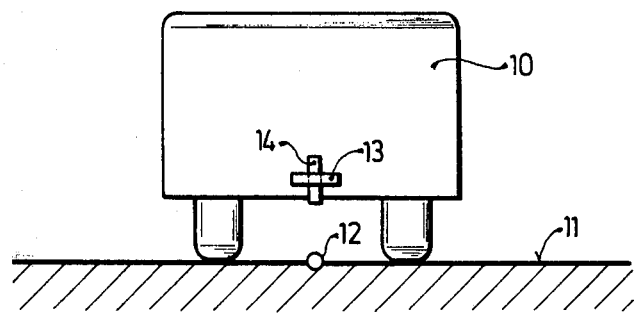
FIG. 1 is a highly schematic end view of a vehicle over a guide path and showing, schematically, the sensing coil arrangement.

A trackless vehicle 10 (FIG. 1) is operable over a surface 11 in which a cable 12 is secured, and through which an a-c signal of, for example 10 kHz, is passed. The vehicle 10 has secured thereto a horizontal coil 13 and a vertical coil 14. The terms "horizontal" and "vertical" designate the direction of the axis of the coil or of the core thereof, respectively. The current through the guide wire 12, the position of which on the surface 11 defines a guide path, generates an essentially circular field thereabout—assuming no external disturbances—which induces voltages in the coils 13, 14 which are processed to determine deviation of the centers of the axes of the coils 13, 14 from the wire 12, and hence provide output signals which control deflection of one or more steerable wheels through a servo steering arrangement to null any positional errors of the axes of the coils 13, 14 from the wire 12.

Figure 2:
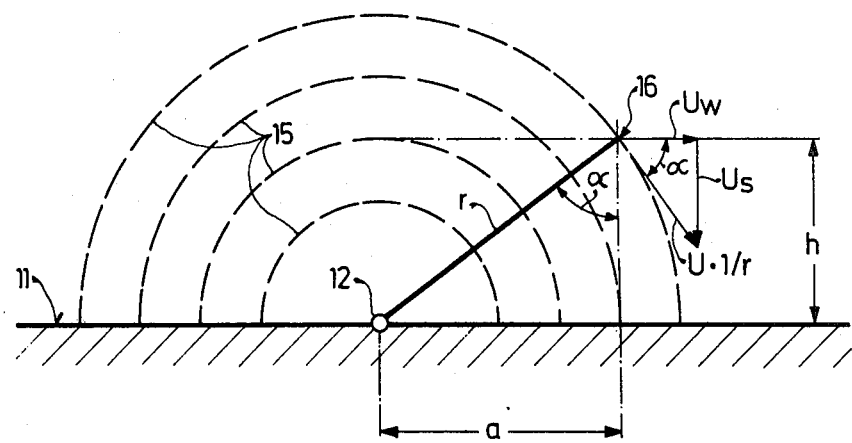
FIG. 2 is a graph illustrating the mathematical basis for the system of the present invention, and field lines of the field generated by the signal in the guide cable.

The magnetic field 15 (FIG. 2) generated by a-c passing through the wire 12 is shown in broken lines; the field is illustrated for the ideal condition, that is, that no ferromagnetic structures or current-carrying elements are located close to the guide wire 12 which might distort the field and cause deviation from a theoretical, true, semicircular shape. The position of the coils 13, 14 in FIG. 2 is placed at point 16, that is, indicating that the vehicle has strayed from exactly following the guide path defined by the cable 12. The dimensions of the coils 13, 14 are neglected in the discussion that follows. This is effectively true if the dimensions of the coils 13, 14 are small with respect to the distance r between the point 16 and the wire 12. If this distance r is substantially greater than the dimension of the coils, the field distribution with the respect to the coils can be assumed to be essentially homogeneous.

The vertical distance of the coils 13, 14 over the surface 11, which is also the distance above the cable 12, is defined by h. It is, preferably, between about 20 to 30 cm above the wire 12. The horizontal distance of the vehicle 10 in the plane of the surface 11 is shown at a. The angle α is the angle between the vertical at point 16 and the radius connection line r between the point 16 and the wire 12. $\overline{U}=1$ is defined as a standardized or normalized voltage, which is the voltage induced in a horizontal coil 13 located at the distance h and positioned exactly above the wire 12. This induced voltage decreases as the distance r increases in the ratio of 1/r and varies as a and hence r changes. At point 16, therefore, the voltage which would be induced in a coil having an axis tangential with respect to the field, that is, perpendicular to the vector of the radius r, would be U·1/r. This voltage can be resolved into a horizontal and a vertical component in accordance with the actual arrangement and position of the coils 13, 14 on the vehicle resulting in voltages $U_s$ for the vertical coil, and $U_w$ for the horizontal coil in accordance with relationships (3) and (4), and in which the relationships of the angles, the radius r and the distance h are related in accordance with the relationships (5). Consequently, and substituting, the vertical and horizontal voltages $U_s$ and $U_w$ are defined as in relationships (6) and (7) and, normalized, as in relationships (8) and (9), in which $\overline{U}_w$ is the voltage actually induced in the horizontal coil 13, and the voltage $\overline{U}_s$ the voltage actually induced in the vertical coil 14.

The change of these voltages, with respect to time, that is, their phase positions and curves, are shown in FIG. 3, graph a.

In accordance with the invention, the peak value $U_s'$ of the vertical voltage $\overline{U}_s$ is determined and compared with the instantaneous voltage induced in the horizontal coil 13, $\overline{U}_w$. Graph a of FIG. 3 illustrates the comparison with the wave superimposed although, actually, the peak value of the voltage induced in the vertical coil can be compared with the actual voltage in the horizontal coil at the next subsequent half wave or wave of like polarity. At a frequency of 10 kHz of the signal in cable 12, the comparison will be accurate for many cycles within the tolerance of guidance of the vehicle. Equating the expressions for the voltages above defined results in relationships (10) which, converted, is relationship (11). This means that the time interval $\Delta t$ between the passage through null of the voltages $U_w$ and $U_s$ and the time $t_0$, in which the voltage $U_w$ induced in the horizontal coil 13 has the same value as the peak voltage $U_s'$ induced in the vertical coil will be representative of the deflection angle $\alpha$ of the coils, and hence of the vehicle from the guide path, that is from the cable 12. Since the height h is constant, the angle $\alpha$ defines the horizontal error position a of the coils from the center 12 or, in other words, the position of point 16 with respect to the cable 12. The time interval $\Delta t$ corresponds to the width of the pulses 19, 19', as illustrated in graph b of FIG. 3. This time interval $\Delta t$ can be evaluated and easily obtained in digital form by starting and stopping a counter, counting at a predetermined clock rate. The count state of the counter then will be representative of the deviation of the vehicle from the guide path. The direction of error position, that is, to the right or to the left of the guide path, can be determined from the relative phasing of the signals $\overline{U}_w$, $\overline{U}_s$. Depending on the relative position of the point 16 with respect to cable 12, the signals shown in FIG. 3, graph a, or graph c, will be induced in the coils 13, 14. The relative phasing of the two signals can be decoded, as will be explained below.

The system which derives the control signals for the steering system (not shown) of the vehicle is shown in FIG. 4. The horizontal coil 13 is connected over amplifier 20 with one input of a first comparator 21, for example an operational amplifier, the other input of which is connected to a reference, for example ground or chassis potential. The output of amplifier 20 is, additionally, connected to one comparison input of a second comparator 22. The vertical coil 14, providing output voltage $U_s$, is connected through amplifier 23 to a peak value sensing circuit 24 and, in turn, to the second input of the comparator 22, for comparison of the peak value of the signal $U_s$ with the then existing value of the signal $U_w$. The peak value sensing circuit 24, preferably, has a storage feature, that is, it stores the peak value of the signal $U_s$ until a subsequent signal $U_s$ appears, at which time the signal previously stored is incremented, or decremented, in accordance with the next succeeding value. Such peak sensing-and-storage circuits are well known. A suitable peak sensing circuit 24 is described in the book by Tietze-Schenk "Halbleiter-Schaltungstechnik", 2nd edition, p. 250, publisher Springer Verlag ("Semiconductor Circuit Technology"). A third comparator 25 is connected to the output of amplifier 23 to sense the zero or null passage of the vertical voltage $U_s$. The outputs of comparators 21 and 25 are connected to an equivalence gate 26 which provides a logic 1-signal if the phasing of the signals from the two coils 13, 14 is as shown in graph a of FIG. 3, and a logic 0-signal if the phasing is in opposite direction, that is, as shown in graph c. The output signals of the comparators 21, 22 and of the equivalence gate 26 are connected to a computer 27, for example a microprocessor. The computer 27 includes a counter 27', which counts the time interval between the change-over of the first comparator 21 and of the second comparator 22 and provides an output number in accordance with the relationships above described which will be representative of the deviation error of the coils 13, 14, that is, of the position of point 16 (FIG. 2) with respect to the cable 12. The switching state, that is, whether a 1 or 0 from the gate 26 provides information whether the point p is to the right or to the left of the cable 12. The computer 27 then provides the appropriate control signal to the steering system, in accordance with the design of the steering system and its control input.

Operation: The output of the first comparator 21 switches over upon passage of the voltage $U_w$ from a 0 to a logic-1. The output of the second comparator switches over at the time $t_0$—see FIG. 3, graphs a and b. The third comparator 25 senses the zero passage of the voltage $U_s$. The counter 27' within computer 27 then provides an output signal representative of the time $\Delta t$ which is processed in the remaining portion of the computer 27 in accordance with the signal requirements of the steering system of the vehicle 10. The computer 27, of course, includes a clock generator to provide a counting rate time base for the counter 27' in accordance with well known technology.

The cost of the counter 27' can be reduced by using a counter operable at a lower counting rate than that which might be needed to resolve signals applied to the coils 13, 14 at the rate of 10 kHz with sufficient accuracy. In accordance with a preferred embodiment of the invention, the signals represented by the voltages $U_w$ and $U_s$ are divided in their frequency. Thus, the amplifiers 20, 23 may, additionally, include a frequency converter stage, controlled by a common intermediate frequency (IF) local oscillator 28. The local oscillator itself can be connected to the output of either one, or both, of the coils 13, 14 to receive a synchronization signal from the voltages induced in the respective coils, so that the frequency of operation of the components 21, 22, 25, 26, 27, and specifically of the counter 27', will operate at a predetermined fraction of the frequency of the signal in cable 12, and at a predetermined phase position with respect thereto.

Figure 5:
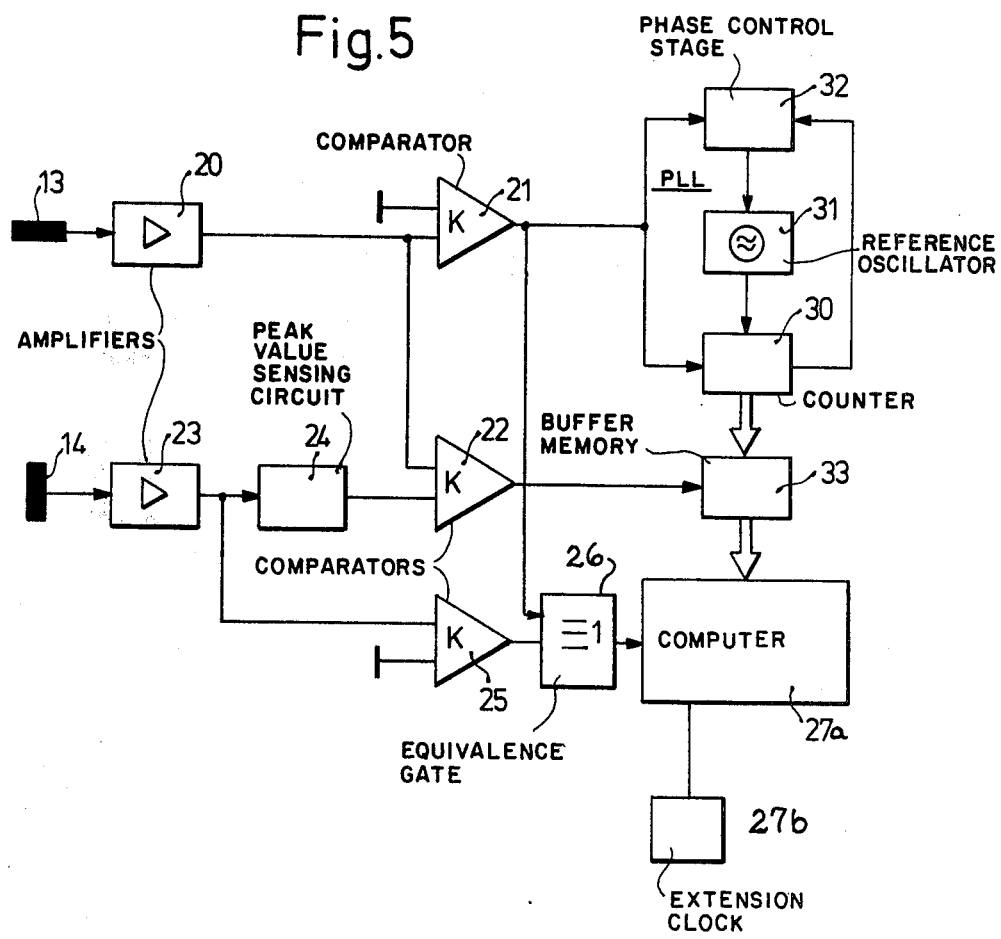
FIG. 5 is a schematic block diagram illustrating a modification of the system.

FIG. 5 illustrates another embodiment in which an external counter system is used to count the time interval $\Delta t$. The output of the first comparator 21 is connected to a counter 30, which counts pulses from a reference oscillator or clock source 31. The counter 30 and the output of the first comparator 21 are additionally connected to a phase control stage 32, to form a phase-locked loop, which is connected to the control input of the reference oscillator 31. The data output of the counter 30 is connected to a buffer memory 33 which has a store input controlled by the output from comparator 22. Thus, the count state of the counter 30 is transferred to the buffer memory 33 when the comparator 22 senses a signal equality at its inputs. The count state in the buffer memory 33 can then be read out by command from the microprocessor 27a at a rate determined by the clock 27b of the microprocessor 27a. The counter 30 counts during the cycles determined by the count intervals $\Delta t$ the pulses of the reference oscillator 31, the frequency of which has a definite relationship with respect to the frequency of the pulse train 19, 19' (FIG. 3).

The phase-locked loop (PLL) determines the frequency relationship of the reference oscillator 31 and the pule train 19, 19'. The PLL determines, for example, that in the counter 30 for each cycle of the pulse train 19, 19' a predetermined maximum number of output pulses of the reference oscillators 31 will be counted; for example, 256 count pulses may be allocated to a half wave of the signals induced in the coils 13, 14, and corresponding to half of the repetition cycle between the pulses 19, 19'. The switching flank at the pulse 19, 19' at the output of the second comparator then will store the respective instantaneous count value of the counter 30 in the buffer memory 33. The data line connecting the buffer memory 33 and the microprocessor 27a permits read-out of the content of the buffer memory 33 at any desired instant of time. Thus, the read-out or operating frequency of the microprocessor 27a can be made independent of the remainder of the system, since the measured time interval Δt is continuously available in the buffer memory in form of a stored number.

Various changes and modifications may be made, and features described in connection with any one of the embodiments may be used with the other, within the scope of the inventive concept.

TABLE OF MATHEMATCIAL RELATIONSHIPS.

$$\overline{U_s} = \cos\alpha \cdot \sin\alpha \cdot \sin\omega t \quad (1)$$
$$\overline{U_w} = \cos^2\alpha \cdot \sin\omega t \quad (2)$$
$$U_s = \frac{U}{r} \sin\alpha \sin\omega t \quad (3)$$
$$U_w = \frac{U}{r} \cos\alpha \sin\omega t \quad (4)$$
$$\cos\alpha = \frac{h}{r} \text{ and } \cdot \frac{1}{r} = \frac{\cos\alpha}{h} \quad (5)$$
$$U_s = \frac{U}{h} \sin\alpha \cdot \cos\alpha \cdot \sin\omega t \quad (6)$$
$$U_w = \frac{U}{h} \cos^2\alpha \cdot \sin\omega t \quad (7)$$
$$\overline{U_s} = \sin\alpha \cdot \cos\alpha \cdot \sin\omega t \quad (8)$$
$$\overline{U_w} = \cos^2\alpha \cdot \sin\omega t \quad (9)$$
$$\cos^2\alpha \sin\omega t_o = \sin\alpha \cos\alpha \quad (10)$$
$$\sin\omega t_o = tg\alpha \quad (11)$$

I claim:

1. Guidance control system for a steerable, trackless vehicle having
a guidance cable (12) positioned in a guidance path, energized by an a-c alternating signal;
at least two pick-up coils (13, 14) in electromagnetic coupling with the field from the guidance cable, said coils being positioned on the vehicle at predetermined height from the cable and having, respectively, horizontal (13) and vertical (14) coil axes, and comprising, in accordance with the invention,
means (21) sensing when the signal ($U_w$) induced in the horizontal coil (13) passes through zero;
means (24) determining the peak value ($U_s'$) of the signal ($U_s$) induced in the vertical coil (14);
means (22) generating an equality signal when said peak value and said horizontal coil signal are equal;
means (27', 30) determining the time interval (Δt) between the sensed passage through zero of the signal ($U_w$) induced in the first coil and the occurrence ($T_o$) of the equality signal, and providing an output signal, said output signal being available as an output for the steering control system of the vehicle as a steering command signal therefor.

2. System according to claim 1, further including phase sensing means (25, 26) connected to the outputs of both said coils (13, 14) and determining the relative phase position of the signal ($U_w$) induced in the horizontal coil and the signal ($U_s$) induced in the vertical coil to obtain output data representative of the direction of the relative position of the axes of said coils with respect to said cable (12) for application to the steering control system of the vehicle.

3. System according to claim 1, wherein the means (21) sensing when the signal ($U_w$) induced in the horizontal coil (13) passes through zero comprises a first comparator connected to the output of the horizontal coil (13) and comparing said output with a zero reference;
wherein said means (22) generating said equality signal comprises a second comparator (22) connected to the output of the horizontal coil (13) and to the means (24) determining the peak value of the signal induced in the vertical coil (14);
and a computer stage (27) processing the outputs of said comparators.

4. System according to claim 3, wherein the means (27, 30) determining the time interval between the outputs of said comparators comprises counter means (27', 30).

5. System according to claim 4, further including means to determine the relative phase position of the signal ($U_w$) induced in the horizontal coil (13) and the signal ($U_s$) induced in the vertical coil, comprising a third comparator (25) having one input connected to the output of the vertical coil (25) and the other input to a reference source;
and an equivalence gate (26) having its inputs connected to the output of the first comparator (21) and to the output of the third comparator (25) and providing an output signal representative of equivalence or non-equivalence of the inputs thereto, the outputs of said equivalence gate being connected to said computer stage (27).

6. System according to claim 1, further including means (28) connected to the outputs of said coils (13, 14) and converting the output thereof to an intermediate frequency which is low with respect to the frequency of the signals induced in said coils by the current flowing through said cable (12).

7. System according to claim 6, wherein said means frequency converting the signals from said coils comprises a local oscillator (28), the frequency of which is controlled as a function of the frequency of the signals induced in at least one of said coils.

8. System according to claim 1, wherein said means (30) determining the time interval includes a counter (30), a signal generator (31) providing clock signals to the counter, and a phase-locked loop (32) controlling the counting rate of said counter.

9. System according to claim 1, wherein said means determining the time interval between the sensed passage through zero of the signal induced in the horizontal coil (13) and the equality signal includes a counter (27', 30);
a buffer memory (33) is provided, connected to the counter and storing the count output therefrom;
and a data processing apparatus (27, 27a) is provided connected to said buffer memory (33) and operable at a clock rate individual to said data processor, to retrieve count data stored in said buffer memory at the clock rate determined by said data processor and permit read-out of the count state independent of the storage rate of data in said buffer memory, and the counting rate of said counter.

10. System according to claim 9, further including phase sensing means (25, 26) connected to the outputs of both said coils (13, 14) and determining the relative phase position of the signal ($U_w$) induced in the horizontal coil and the signal ($U_s$) induced in the vertical coil to obtain output data representative of the direction of the relative position of the axes of said coils with respect to said cable (12) for application to the steering control system of the vehicle.

* * * * *